Sept. 2, 1969          A. CARABASSE          3,464,140

COMPOSITE FISHING LINE

Filed June 15, 1967                                                 2 Sheets-Sheet 1

INVENTOR
ANDRÉ CARABASSE
BY
Bacon & Thomas
ATTORNEYS

Sept. 2, 1969   A. CARABASSE   3,464,140
COMPOSITE FISHING LINE
Filed June 15, 1967   2 Sheets-Sheet 2
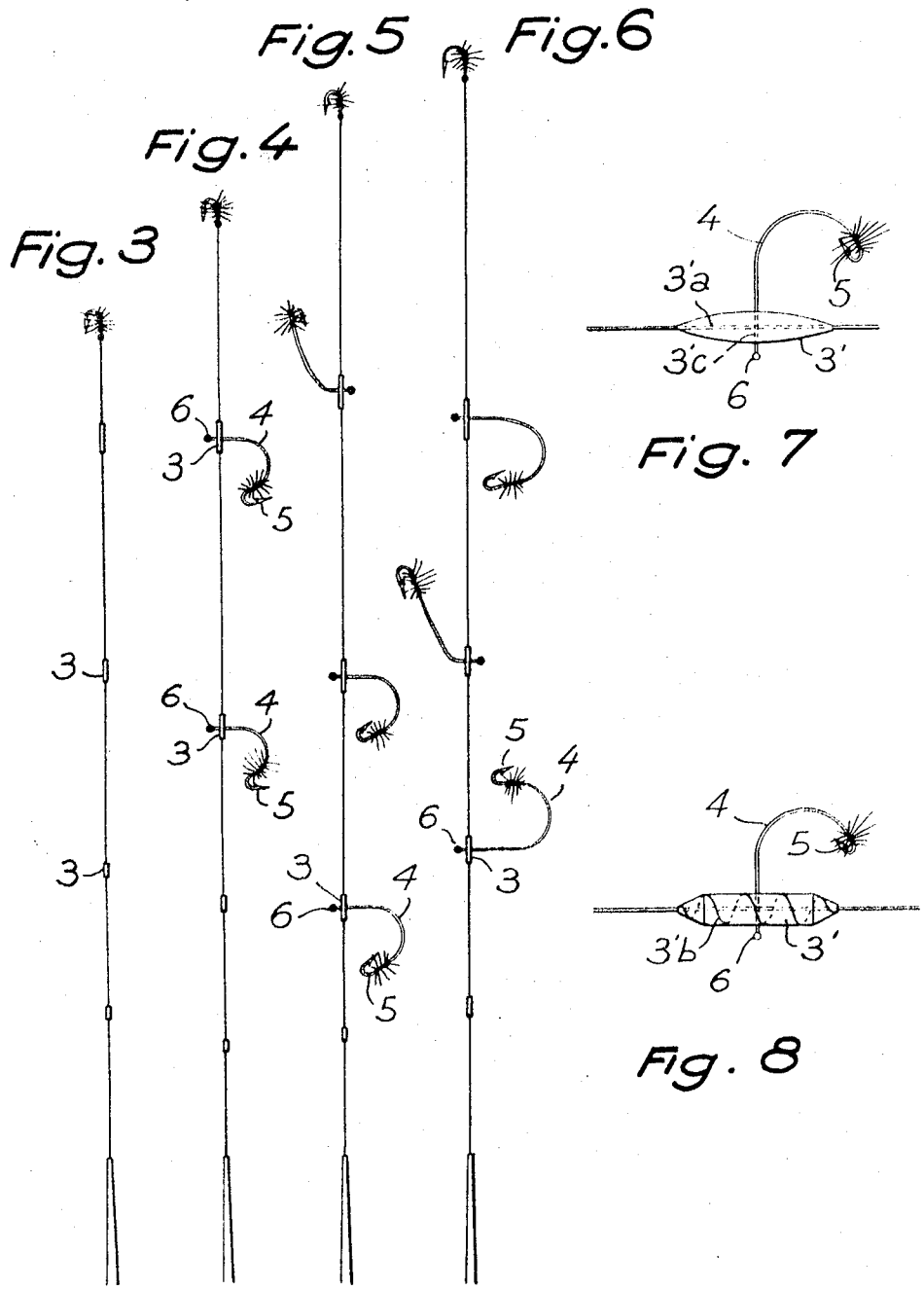
INVENTOR
ANDRÉ CARABASSE
BY
Bacon & Thomas
ATTORNEYS

United States Patent Office 3,464,140
Patented Sept. 2, 1969

3,464,140
COMPOSITE FISHING LINE
André Carabasse, 20 Rue du Tribunal,
Doullens, Somme, France
Filed June 15, 1967, Ser. No. 646,229
Claims priority, application France, June 24, 1966, 66,773;
May 26, 1967, 108,114
Int. Cl. A01k 91/00
U.S. Cl. 43—42.74      2 Claims

ABSTRACT OF THE DISCLOSURE

A fishing-line composed of a "nylon" line surrounded over at least a portion of its length by an unsinkable sheath formed of woven silk. The silk is woven into a cylindrical portion having tapered portions on each end thereof, the cylindrical portion having a cross-section equal to the maximum cross-section of each tapered portion.

---

The present invention relates to a composite fishing-line particularly for use in fly-fishing.

The commercial silks used for this type of fishing have a sheath woven from natural silk-threads, "tergal" or "nylon," but these threads are bulky (of the order of 29 cm.$^3$/30 m. of silk), and heavy (25 to 29 g./30 m.); thus, 27 to 30 m. of silk occupy the whole of the free volume of the rotatable drums of most current reels of the drum-type and are liable to produce imperfect winding. The lines can only be cast after making successive coils from lengths of silk previously unwound by hand during dummy casts.

The main object of the present invention therefore is to provide a composite line constituted by a "nylon" thread covered over at least a part of its length with an unsinkable sheath. The composite line according to the invention has the advantage of taking up less space on the drum of the fishing-reel, of not having a heavy length of trailing-line, which would become impregnated with water and sink, of only wetting the fishing-rod with a minimum quantity of water, of being capable of use with fixed drum-reels which are more practicable than rotary-drum-reels but of less capacity, of not requiring numerous dummy casts, and therefore not necessitating a rod which is whippy, light, very sensitive and resistant, and the rod can therefore be much less expensive.

In a first embodiment of the composite line, the latter is constituted by a "nylon" thread having thereon over at least a portion of its length a non-sinkable sheath of woven silk.

The sheath is preferably woven in a first tapered portion of increasing section, followed by a cylindrical portion having a section equal to the maximum section of the first tapered portion; this cylindrical portion is itself followed by a second tapered portion of diminishing section, which latter terminates in a second cylindrical portion having a section equal to the minimum section of the second tapered portion.

In an other embodiment of the composite line, the sheath is constituted by an olefinic polymer and/or copolymer, extruded and expanded directly onto the "nylon" thread, without the inclusion of any reinforcement means, the "nylon" thread itself endowing the composite line with the desired resistance and tensile strength.

The length of the sheath preferably does not exceed 25% of the length of the "nylon" thread.

In an other variant of the invention, the bare part of the "nylon" thread which is at that side of the sheath towards the free end of the line is provided with short sheath elements, which may be removable and which preferably decrease in length from the end of the line towards the sheath; each element has a leader of "nylon" thread passing radially therethrough, which leader has at one of its ends a fly and at the other a small balance weight to maintain the leader out of the water.

The term "nylon" designates synthetic polyamides, but also includes spinnable plastic materials whose filaments have a certain elasticity, for example polyesters.

The invention will be described hereafter with reference to the accompanying drawings in which:

FIG. 3 shows an other embodiment of the composite line of FIG. 2 for trout-fishing with a single floating fly in small rivers having difficult access.

FIG. 4 shows a further variant of the composite line of FIG. 2 for trout-fishing with a row of wet and dry flies in torrential waters.

FIG. 5 is a further variant of the composite line of FIG. 2 for trout or chub fishing with a row of dry and wet flies for wide rivers with regular currents.

FIG. 6 is a variant of the composite line of FIG. 2 for salmon-fishing in mountain torrents.

FIGS. 7 and 8 show different elements of the sheath carried by the bare portion of "nylon" line on that side of the sheath towards the free end of the line.

Figure 1:
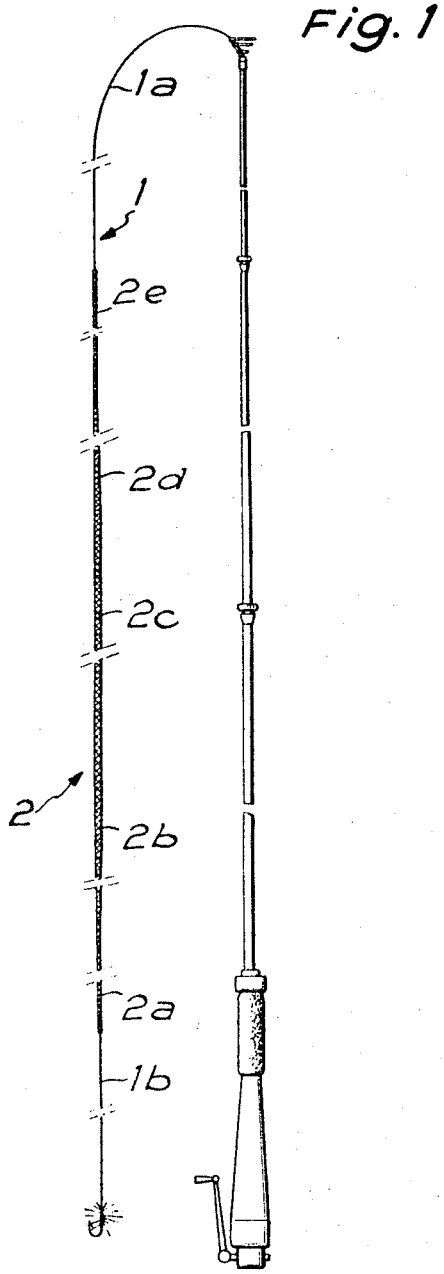
FIG. 1 shows the composite line having a sheath of woven silk partially unwound from a reel of the fixed drum-type mounted on the end of the fishing rod.

In the embodiment of composite line shown in FIG. 1 of the drawings, for fly-fishing, the line 1 is a "nylon" line sheathed over a certain portion of its length with woven silk 2 of the unsinkable kind, having the following characteristics:

(a) the end 2a of the sheath portion having an external diameter of from 0.35 to 1 mm., the silk is woven in a first tapered portion 2b of length from 0.80 to 1.50 m. and of external diameter which can be as great as 3 mm. according to the length of the average casts to be made with the fishing-rod, (b) this first tapered portion is followed by a first cylindrical portion 2c having a section equal to the maximal section of the first tapered portion, along a length less than or equal to 10 m., (c) the first cylindrical portion is followed by a second tapered portion 2d extending along a length of 0.80 to 1.50 m. and having the external diameter of the silk and progressively changing to the smallest diameter of the first tapered portion, (d) the second tapered portion is followed by a second cylindrical portion 2e of the same section, i.e., of a diameter equal to the smallest diameter of the first tapered portion and of a length less than or equal to 5 m.

The unsheathed portion 1a of the "nylon" line towards its free end has a length suitable for the type of fishing to be performed, for example, of the order of 10 to 30 m. for trout and of 20 to 50 m. for salmon, the said portion being fixed directly to the bobbin of the reel; the unsheathed portion 1b of the "nylon" thread has a length of from at least 0.50 m. and forms the part of the line which carries the bait.

Figure 2:
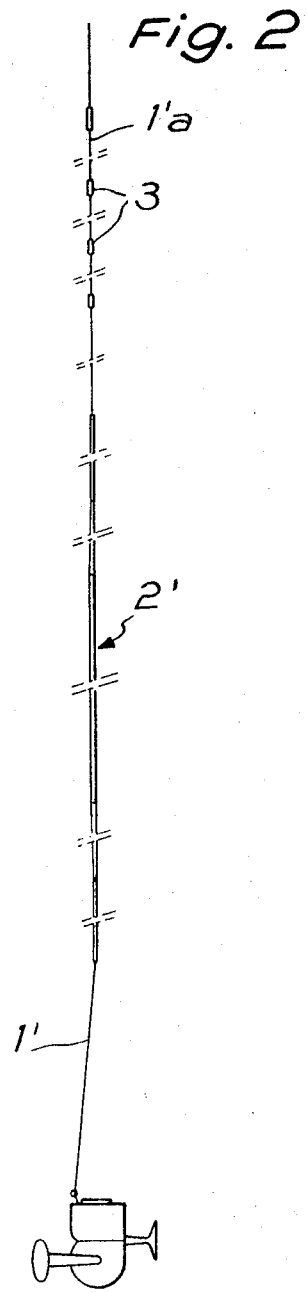
FIG. 2 shows a composite line having a sheath obtained by extrusion.

In the embodiment shown in FIG. 2 of the drawings, the sheath 2' is formed from a polyolefine resin and/or an olefine cooplymer to which an expanding agent is added, such as 4,4-oxybis-benzine sulfonyl-hydrazin known under the name "celogen" (which decomposes at about 150° C.) directly extruded on to the "nylon" thread 1', calibrated and expanded; the sheathed line has an external diameter of between 0.4 and 2.5 mm., a specific gravity less than or equal to 0.9 gm./cm.$^3$ and preferably of 0.7 gm./cm.$^3$, which corresponds for the sheath alone to a specific gravity less than or equal to 0.7 gm./cm.$^3$ and preferably to 0.5 gm./cm.$^3$, the sheath having a length of at least 20 m. (25% of the length of the "nylon" line).

The part 1′a of the "nylon" line to the hook side of the sheath, of length from 1.50 m. to 2.10 m. has sheath elements 3 (FIGS. 2 and 3) of the same composition as that specified above, of diameter between 1 and 3 mm. and of length which decreases from the end of the line towards the sheathed portion and of between 70 and 30 mm.

In the embodiments shown in FIGS. 4 to 6, certain of the sheath elements 3′ each have, passing through their middle portion, a leader 4 of nylon thread having at one of its ends a fly 5, and at its other end a balance weight 6, each sheath element having its "nylon" thread and its balance weight being only partially immersed, so that each leader is held out of the water and places its dry fly on the surface of the water.

The sheath is made for example from expanded low density polyethylene having a mass per unit volume of 0.45 and formed directly by extrusion, and expansion on the "nylon" line so as to have a diameter of 0.20 mm., the sheathed part of the composite line having an external diameter of 0.4 to 2.5 mm., and a specific gravity lower than 0.70 gm./cm.$^3$, and preferably 0.5 gm./cm.$^3$.

In order to obtain a composite line having a certain flexibility, the sheath can also be made from a compound containing approximately 50 to 70% of low density polyethylene, and about 50 to 30% of an elastomer of polyisobutene or a copolymer of ethylene and propylene.

In order to obtain a composite line of great flexibility, the sheath can be formed from a copolymer of ethylene and vinyl acetate (having 5 to 10% of vinyl acetate).

The elements of the sheath 3′ (FIGS. 7 and 8), are preferably detachable and for this purpose they can be made by extrusion in a chain on a polished steel wire of decreasing section; the narrowed parts of the chain are formed, for example, by contraction using heated tongues; the thicker parts of the chain are longitudinally split at 3a or helicoidally split at 3b right down to the steel wire, by a heated blade or wire, for the purpose of separating the said chain from the steel wire. The thicker parts may be transversally perforated at their centers at 3c by a heated needle to take the leader threads, the elements of the chain being then cut into sections at right angles to the narrow parts and placed on the composite line.

The elements of the sheath can be of cylindrical prismatic or ovoid form.

The composite line according to the invention has many advantages:

The unwinding of the composite line during casting is much easier than that of a silk-line.

The heavy part of the line, constituted by the silk or the sheath, is accurately adaptable to the casting forces of the fishing-rod used.

This heavy portion of the line does not have to trail behind it a useless weight of fragile silk, which easily becomes wet and thus heavier with each casting.

The "nylon" thread firmly connected to the casting part of the line, i.e. to the silk or to the sheath, can be maintained, after casting the fly, out of the water by dent of a rapid operation of the reel, and there is thus less tendency for the line to be caught by the wind and above all for the line to drift, which drifting is often caused by a strong current when the line is cast from one bank of a river to the opposite bank.

The composite line enables rapid winding manual reels to be used, thus enabling the flies to travel at the speed of the current without excessive slack line.

The bulk of the line, which is less than 30% of that of a usual silk line enables fixed drum reels to be used, which reels, equipped with a set of interchangeable bobbins carrying composite lines of various calibres of nylon core and of various length of sheath enable the fisherman to adapt to fishing in all types of rivers.

The cost of a bobbin of composite line being about 10 times less than that of a silk line used hitherto, enables the bobbin of composite line to be thrown away when it is seriously damaged.

The sheathing without intermediate weaving reinforces by 5 to 10% the strength of the composite line in its sheathed portion.

The sheath easily follows the extensions and contractions of the nylon core of the composite line which occur during use.

The fly carrying elements of the sheath balanced by weights, present the bait on the water in a new and advantageous manner; their partial immersion and small length has no more tendency to drift than the nylon-line immersed throughout its length. The nylon-line between two elements being wet, is scarcely visible to the fish and the sheath elements on the water resemble fragments of straw or grass and do not frighten the fish.

The dry flies hanging from the leaders held up by their counter weights are better presented; their capacity for floating last longer and the fact that the leader is out of the water makes the latter hardly visible to the fish, and enables a leader having any diameter to be used.

What is claimed is:

1. A composite fishing line comprising: a continuous line of "nylon"; a sheath of buoyant material enveloping not more than about one-fourth of the length of said line, bare portions of said continuous line extending outwardly of both ends of said sheath; the bare portion of the "nylon" line extending from one end of the sheath is provided with short sheath-elements forming floats, the length of the elements diminishing from the end of the line towards the sheath.

2. A fishing-line according to claim 1 characterized in that at least one sheath-element has a leader thread of "nylon" passing radially therethrough, which leader has at one of its ends a fly and at the other a small balance-weight for maintaining the leader out of the water.

References Cited

UNITED STATES PATENTS

| | | | |
|---|---|---|---|
| 1,914,174 | 6/1933 | Smith | 43—44.98 X |
| 1,927,581 | 9/1933 | Bekeart | 43—44.98 X |
| 2,250,832 | 7/1941 | Hedge | 43—44.98 |
| 2,684,552 | 7/1954 | Berlew | 43—44.98 |
| 2,929,168 | 3/1960 | Furuto | 43—44.84 |
| 3,334,436 | 8/1967 | Cole | 43—44.98 |

FOREIGN PATENTS 898,480    6/1962    Great Britain.

SAMUEL KOREN, Primary Examiner

DANIEL J. LEACH, Assistant Examiner

U.S. Cl. X.R.

43—43.15, 44.84, 44.98